Oct. 8, 1929.  H. DE F. OLIVARIUS  1,730,473
PROCESS OF RECOVERING SUCROSE FROM CANE MOLASSES
Original Filed Dec. 22, 1925
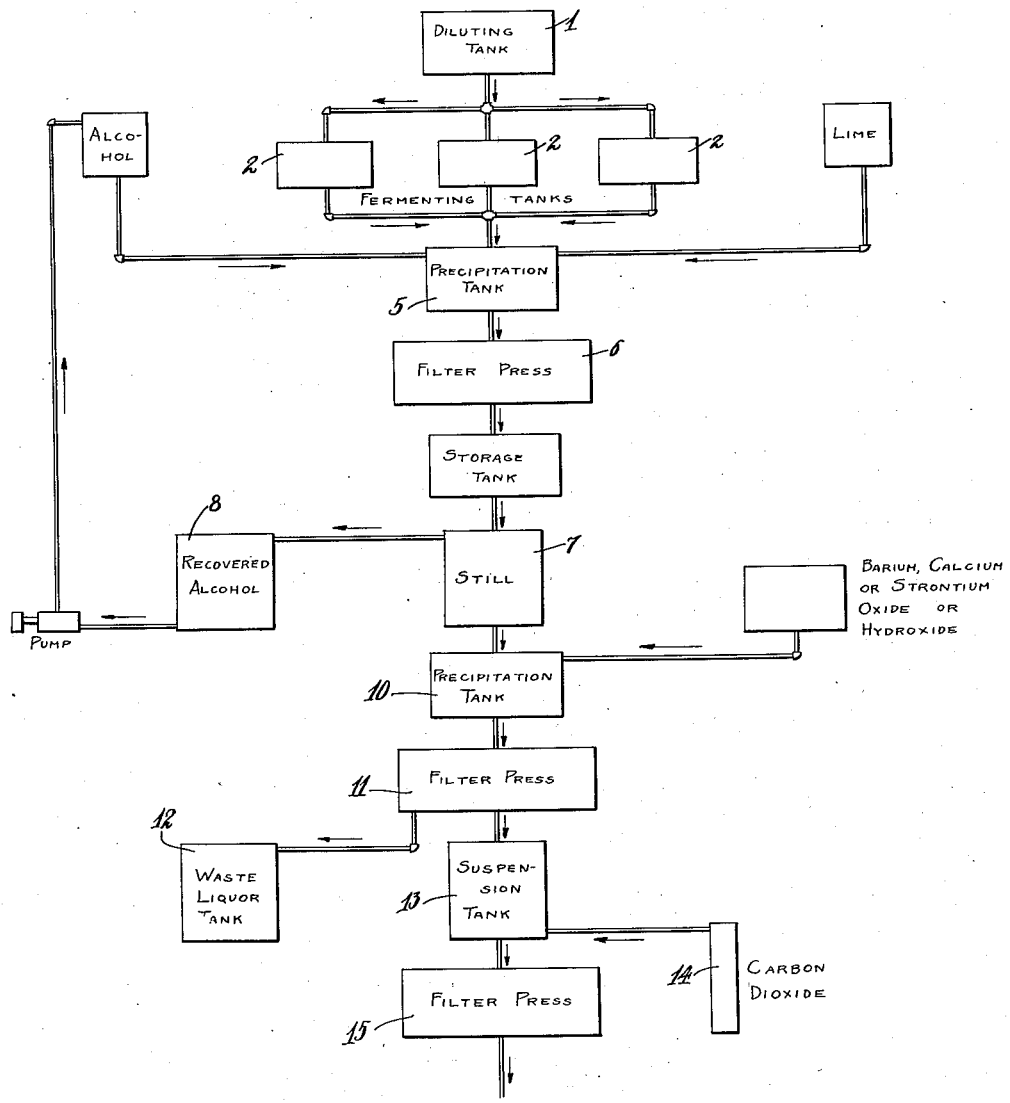
Inventor
Holger de Fine Olivarius.
By Lyon & Lyon
Attorneys Patented Oct. 8, 1929

1,730,473

UNITED STATES PATENT OFFICE

HOLGER DE FINE OLIVARIUS, OF SAN FRANCISCO, CALIFORNIA, ASSIGNOR TO CALIFORNIA PACKING CORPORATION, OF SAN FRANCISCO, CALIFORNIA, A CORPORATION OF NEW YORK

PROCESS OF RECOVERING SUCROSE FROM CANE MOLASSES

Application filed December 22, 1925, Serial No. 76,965. Renewed February 25, 1929.

This invention relates to the recovery of sucrose from cane molasses. The object of this invention is to provide an economical method for the recovery of sucrose from cane molasses.

It has been known that sucrose could be recovered from cane molasses by first fermenting the molasses to eliminate invert sugar and then mixing the fermented molasses with alcohol, adding sufficient lime to the solution to precipitate the organic and coloring matter without precipitating the sucrose, separating the precipitate from the solution, and adding further lime to the alcoholic filtrate to precipitate substantially all of the sucrose as calcium saccharate. See U. S. Letters Patent No. 1,401,433 granted December 27, 1921, to me. My prior process was based upon the theory that this result was accomplished because of retaining the alcohol in the mixture subsequent to the precipitation of the organic and coloring matter and during the precipitation of the saccharate. I found that the alcohol loss resulting from retaining the alcohol for so long a period in the process was objectionably high.

Oxides and hydroxides of earthy metals such as calcium, barium and strontium, have long been employed as agents for precipitating sucrose from beet sugar molasses, but to my knowledge they have never been heretofore successfully employed for precipitating sucrose from cane sugar molasses except by precipitating the sucrose as a saccharate from an alcoholic solution as above described. I have now discovered that the precipitation of sucrose from can sugar molasses by employing oxides and hydroxides of earthy metals as precipitating agents is not necessarily dependent upon precipitating sucrose as a saccharate from an alcoholic solution but rather depends upon the elimination of the invert sugar and organic and coloring matter from the molasses prior to the precipitation of the saccharate. Apparently the invert sugar and certain organic bodies contained in cane molasses constitute interfering bodies that have heretofore caused the difficulty when the recovery of sucrose from cane molasses has been attempted by employing earthy metal oxides and hydroxides as precipitating agents.

My present invention renders practically applicable to the recovery of sucrose from cane molasses of methods that have been long successfully employed for the precipitation of sucrose as a saccharate from beet molasses.

The object of my present invention is to provide a process for recovering sucrose from cane molasses, in which process the alcohol employed in precipitating certain interfering organic and coloring matter from the molasses is separated from the molasses prior to the precipitation therefrom of the saccharate.

My invention and discovery may be embodied in a number of different ways and for the purpose of illustration I have set forth in the following description a preferred method of procedure embodying my invention and the same may be more readily understood by referring to the accompanying drawing comprising a flow-sheet depicting the method thus described.

Referring to the drawing it is preferred to first eliminate the invert sugar content of the molasses from which the sucrose is to be recovered and for that purpose the molasses is mixed with water in a diluting tank 1 and the mixture passed to fermenting tanks 2. Yeast is added to the mixture in the tanks 2 for the purpose of converting the invert sugar content of the molasses to alcohol and carbon dioxide, etc. I have discovered that there are certain advantages in employing a relatively highly concentrated mixture of molasses and water in this fermentation process. If a relatively highly concentrated mixture of molasses and water be employed I have found that special yeast need not be employed and that ordinary yeasts will all function satisfactorily and that the usual conversion takes place without substantial loss of sucrose due to the inverting action of the yeasts. I have found that a concentration of approximately 65° Brix is well suited to my purposes.

After fermentation the mixture is passed from the tanks 2 to a precipitating tank 5 and alcohol together with lime or other earthy metal oxides or hydroxides are added to the mixture in proper propertion to precipitate preferably substantially all of the interfering organic bodies such as gums, waxes, etc., and coloring matter, in the mixture without precipitating any substantial portion of the sucrose.

The mixture is then passed from the precipitating tank 5 to a filter press 6 for the separation of the precipitated bodies from the filtrate containing the sucrose.

The process to this point does not differ from that described in my patent aforesaid, except as to the concentration employed and the fact that with proper concentration it is unnecessary to use specially adapted yeast, but with the prior practice it has been considered necessary to retain the alcoholic character of the filtrate in the subsequent precipitating action to follow.

I have discovered that where precipitating agents metals are employed as precipitating agents the filtrate discharged from the filter press 6 may be passed through a still 7 and the alcohol there separated and recovered in a suitable chamber 8. The alcohol may be re-used by pumping it back to the precipitating tank 5.

The molasses from which the interfering bodies such as invert sugar, gums, coloring matter, etc., have been removed, is passed to a precipitating tank 10 where an earthy metal oxide or hydroxide is added in proper proportion to precipitate its corresponding saccharate. The mixture from the precipitating tank 10 is then passed to a filter press 11 and the saccharate filtered from the waste liquor, the latter passing to tank 12. The saccharate is passed from the filter press 11 to a suspension tank 13 and is there treated with carbon dioxide from a suitable source of supply 14 to decompose the saccharate into its corresponding carbonate and free sucrose. The mixture of carbonate and sucrose is then passed to a filter 15 for separation and the filtrate (sucrose) thereupon evaporated, decolorized and crystallized by well known methods.

I have found that the different earthy metal oxides and hydroxides serve to the best advantage as precipitating agents in the aforesaid process under somewhat varying conditions. Where calcium oxide or hydroxide is employed as a precipitating agent for sucrose from a non-alcoholic solution the best results are obtained by employing a temperature not exceeding 20° C. Where barium and strontium are used as the precipitating agents, best results are obtained by precipitating the saccharate at a boiling temperature. These specific methods of precipitation are recognized as old in the recovery of sucrose from beet molasses and the present invention resides not in such specific methods of precipitation per se but in the adaptation of the same to the recovery of sucrose from cane molasses by first purifying the molasses to eliminate interfering invert sugar and organic bodies such as above stated. No specific proportions are here given because the same vary with the composition of the molasses and should and may readily be determined by preliminary test and analysis.

It will be apparent that the advantages of the present invention may be accomplished in part by only partially eliminating the interfering bodies above described, or by removing only a portion of the alcohol prior to the precipitation of the saccharate, and as these advantages are in part, as well as in whole, due to the present invention, the same is intended to be covered in the following claims either when fully or only partially practiced.

I claim:

1. The process of recovering sucrose from cane molasses which includes fermenting the molasses to eliminate invert sugar, mixing the fermented molasses with alcohol, adding an earthy metal oxide or hydroxide to the solution to precipitate interfering organic and coloring matter without materially precipitating the suchose, separating the precipitated organic and coloring matter from the solution, separating the alcohol from the solution, and treating the residual solution with an earthy mineral oxide or hydroxide to precipitate the sucrose.

2. The process of recovering sucrose from cane molasses which includes fermenting the molasses to eliminate invert sugar, mixing the fermented molasses with alcohol, adding an earthy metal oxide or hydroxide to the solution to precipitate interfering organic and coloring matter without materially precipitating the sucrose, filtering the solution to separate the precipitated organic and coloring matter, removing the alcohol from the filtrate, and precipitating the sucrose from the nonalcoholic filtrate by an earthy mineral oxide or hydroxide.

3. The process of recovering sucrose from cane molasses which includes mixing alcohol with the molasses, adding an earthy metal precipitating agent to the mixture to precipitate interfering organic and coloring matter without materially precipitating the sucrose, separating the precipitated organic and coloring matter from the molasses, separating the alcohol from the molasses, and then treating the molasses with an earthy metal precipitating agent at a suitable temperature to precipitate the sucrose therefrom.

4. The process of recovering sucrose from cane molasses comprising, mixing molasses with water to form a solution of about 65° Brix, adding a yeast thereto, fermenting the solution to eliminate invert sugar without materially inverting sucrose, mixing the fermented solution with alcohol, adding an earthy metal precipitating agent to the mixture to precipitate interfering organic and coloring matter without materially precipitating sucrose, separating the precipitated organic and coloring matter from the solution, separating the alcohol from the solution, and then treating the solution with an earthy metal precipitating agent to precipitate the sucrose therefrom.

Signed at Palermo, Calif., this 9th day of December, 1925.

HOLGER DE FINE OLIVARIUS.